US012570069B2

(12) United States Patent
Nitta et al.

(10) Patent No.: US 12,570,069 B2
(45) Date of Patent: Mar. 10, 2026

(54) DEVICE AND METHOD FOR REPLACING STAGE ROLL UNIT

(71) Applicant: MITSUBISHI HEAVY INDUSTRIES MACHINERY SYSTEMS, LTD., Hyogo (JP)

(72) Inventors: Takashi Nitta, Hyogo (JP); Yukikazu Shoji, Hyogo (JP); Hideki Mizutani, Hyogo (JP)

(73) Assignee: MITSUBISHI HEAVY INDUSTRIESMACHINERY SYSTEMS, LTD, Kobe (JP)

( * ) Notice: Subject to any disclaimer, the term of this patent is extended or adjusted under 35 U.S.C. 154(b) by 225 days.

(21) Appl. No.: 17/424,683

(22) PCT Filed: Dec. 5, 2019

(86) PCT No.: PCT/JP2019/047546
§ 371 (c)(1),
(2) Date: Jul. 21, 2021

(87) PCT Pub. No.: WO2020/153009
PCT Pub. Date: Jul. 30, 2020

(65) Prior Publication Data
US 2022/0105699 A1 Apr. 7, 2022

(30) Foreign Application Priority Data
Jan. 23, 2019 (JP) ................................ 2019-009458

(51) Int. Cl.
*B31F 1/26* (2006.01)
*B21B 31/10* (2006.01)
*B31F 1/28* (2006.01)

(52) U.S. Cl.
CPC .............. *B31F 1/26* (2013.01); *B21B 31/103* (2013.01); *B31F 1/2868* (2013.01)

(58) Field of Classification Search
CPC .......... B31F 1/26; B31F 1/2868; B66F 9/065; B66F 9/20; B21B 31/103; B21B 31/10
See application file for complete search history.

(56) References Cited

U.S. PATENT DOCUMENTS 3,699,796 A 10/1972 Eibe et al.
4,074,558 A * 2/1978 Pim ...................... B21B 31/103 72/239

(Continued)

FOREIGN PATENT DOCUMENTS

JP 658138507 A 8/1983
JP 2018118390 A 8/2018

OTHER PUBLICATIONS

Extended European Search Report for European Application No. 19911404.2 mailed Jan. 18, 2022; 8pp.

(Continued)

*Primary Examiner* — Christopher J. Besler
(74) *Attorney, Agent, or Firm* — HAUPTMAN HAM, LLP

(57) ABSTRACT

Provided are a device and a method for replacing a stage roll unit. This stage roll unit replacement device for performing work for replacing a stage roll unit between a single facer and a stage roll unit transporting cart is provided with: a replacement cart that can move in an X-direction in which the stage roll unit is replaced; a moving device that can move the replacement cart in the X-direction; and a connection device that connects the replacement cart and the stage roll unit.

9 Claims, 6 Drawing Sheets

(56) References Cited

U.S. PATENT DOCUMENTS

| | | | | | |
|---|---|---|---|---|---|
| 5,150,514 | A | | 9/1992 | Seki et al. | |
| 5,660,068 | A | * | 8/1997 | Yamamoto | B21D 3/05<br>72/239 |
| 7,617,856 | B2 | | 11/2009 | Gnan | |
| 2019/0381756 | A1 | | 12/2019 | Nitta | |

OTHER PUBLICATIONS

International Search Report and Written Opinion of International Application No. PCT/JP2019/047546, mailed Mar. 3, 2020; 10 pgs.

* cited by examiner

DEVICE AND METHOD FOR REPLACING STAGE ROLL UNIT

RELATED APPLICATIONS

The present application is a National Phase of International Application Number PCT/JP2019/047546 filed Dec. 5, 2019 and claims priority to Japanese Application Number 2019-009458 filed Jan. 23, 2019.

TECHNICAL FIELD

The present invention relates to an apparatus and method for replacing a corrugating roll unit composed of upper and lower corrugating rolls that form a medium by corrugating medium paper in a single facer that manufactures a single-faced cardboard sheet by bonding a liner to a corrugated medium.

BACKGROUND ART

A corrugating machine as a cardboard sheet manufacturing apparatus includes a single facer that forms a single-faced cardboard sheet and a double facer that forms a double-faced cardboard sheet by bonding bottom liner paper to a single-faced cardboard sheet. The single facer processes medium paper (a medium) into a corrugated shape and bonds a top liner to the corrugated medium paper to form the single-faced cardboard sheet, and the double facer bonds a bottom liner to the single-faced cardboard sheet to form a double-faced cardboard sheet. The continuous double-faced cardboard sheet manufactured by the double facer is cut to a predetermined width by a slitter scorer and cut to a predetermined length by a cutoff device, so that cardboard sheets are formed.

In the single facer of the corrugating machine, the top liner heated by a preheater is transferred to a nip portion between a pressurizing belt and an upper corrugating roll, and on the other hand, the medium paper heated by a preheater is processed into a corrugated shape at the meshing portion between the upper corrugating roll and a lower corrugating roll, whereby a medium is formed, and after an adhesive is applied to a top portion of each corrugation of the medium, the medium is transferred to the nip portion. Then, at the nip portion, the medium is bonded to the top liner, whereby a single-faced cardboard sheet is formed.

In the single facer, in order to manufacture a plurality of types of mediums having different wave shapes, a plurality of types of upper and lower corrugating rolls are prepared according to the types of mediums to be manufactured, and a corrugating roll unit composed of upper and lower corrugating rolls can be replaced with respect to the single facer. In this case, a transporting carriage with the corrugating roll unit mounted thereon moves to the vicinity of the single facer and is positioned at a predetermined replacement position, and then an operation of replacing the corrugating roll unit with respect to the single facer is carried out. As a corrugating roll unit replacing apparatus, there is a corrugating roll unit replacing apparatus disclosed in PTL 1 below. The corrugating roll unit replacing apparatus disclosed in PTL 1 performs the removal and mounting of a corrugating roll unit by moving a carriage with the corrugating roll unit mounted thereon to a replacement position along a guide rail, and here, raising a drive pinion disposed on a floor surface to cause it to mesh with a rack formed on a lower surface of the corrugating roll unit, and rotating the drive pinion.

CITATION LIST

Patent Literature

[PTL 1] U.S. Pat. No. 7,617,856

SUMMARY OF INVENTION

Technical Problem

As described above, a plurality of types of corrugating roll units are prepared according to the types of mediums having different wave shapes, and each corrugating roll unit is stored in a predetermined storage place in a state of being mounted on a transporting carriage. Therefore, the transporting carriages are required by the number of the types of corrugating roll units. In the corrugating roll unit replacing apparatus of PTL 1, it is necessary to dispose the drive pinion on the floor surface so as to be able to be raised and lowered, and to form the rack on the corrugating roll unit side. Therefore, there is a problem in that the structure of the corrugating roll unit becomes complicated and a manufacturing cost increases.

The present invention is to solve the problem described above, and has an object to provide an apparatus and method for replacing a corrugating roll unit, in which simplification of a structure and a cost reduction are attained.

Solution to Problem

In order to achieve the above object, according to an aspect of the present invention, there is provided a corrugating roll unit replacing apparatus for performing an operation of replacing a corrugating roll unit between a single facer and a corrugating roll unit transporting carriage, including: a replacement carriage capable of moving along a replacement direction of the corrugating roll unit; a movement unit capable of moving the replacement carriage in the replacement direction; and a connection device that connects the replacement carriage and the corrugating roll unit.

Therefore, the replacement carriage and the corrugating roll unit are connected by the connection device, and the replacement carriage can be moved along the replacement direction of the corrugating roll unit by the movement unit, so that the corrugating roll unit can be removed from the single facer or the corrugating roll unit of the corrugating roll unit transporting carriage can be mounted to the single facer. Therefore, it is not necessary to provide a movement unit at the corrugating roll unit transporting carriage, and thus the simplification of a structure and a cost reduction can be attained.

In the corrugating roll unit replacing apparatus according to the present invention, the connection device is provided at the replacement carriage, and includes a locking hook capable of moving to a locking position where the locking hook is locked to the corrugating roll unit and a release position where the locking hook releases the locking, and a drive device capable of moving the locking hook.

Therefore, since the connection device is provided at the replacement carriage and the locking hook can be moved to the locking position and the release position by the drive device, the corrugating roll unit can be easily moved along the replacement direction by moving the replacement carriage in a state where the replacement carriage and the corrugating roll unit are connected by the connection device.

In the corrugating roll unit replacing apparatus according to the present invention, when the locking hook is at the locking position, the replacement carriage can pull and move the corrugating roll unit to one side in the replacement direction through the locking hook, and push and move the corrugating roll unit to the other side in the replacement direction through the locking hook.

Therefore, the corrugating roll unit can be easily moved along the replacement direction by moving the replacement carriage in a state where the locking hook has been moved to the locking position by the drive device.

In the corrugating roll unit replacing apparatus according to the present invention, the locking hook is capable of being locked to a locking pin provided at an end portion on the replacement carriage side of the corrugating roll unit.

Therefore, merely by providing the corrugating roll unit with the locking pin, the locking hook that is located on the replacement carriage side is locked to the locking pin to be capable of connecting the replacement carriage and the corrugating roll unit, and thus it is possible to suppress the complication of a structure.

In the corrugating roll unit replacing apparatus according to the present invention, a guide rail is provided along the replacement direction, the replacement carriage is supported to be movable along the guide rail, a retreat space for the replacement carriage is provided on one side in the replacement direction of the single facer, and a connection space for the replacement carriage is provided on the other side in the replacement direction of the single facer.

Therefore, since the retreat space for the replacement carriage is provided on one side of the single facer and the connection space for the replacement carriage is provided on the other side of the single facer, during the operation of the single facer, by moving the replacement carriage to the retreat space, the replacement carriage does not interfere with the operation, and at the time of the operation of replacing the corrugating roll unit, by moving the replacement carriage to the connecting space, it is possible to easily perform the connection operation with the corrugating roll unit.

In the corrugating roll unit replacing apparatus according to the present invention, the single facer includes upper and lower corrugating rolls that clamp medium paper and perform corrugating processing, and an endless pressurizing belt that is wound around a plurality of support rolls and pressurizes and joins the corrugated medium paper and a liner together with one of the upper and lower corrugating rolls, and the replacement carriage is provided with a belt support member that blocks lowering of the pressurizing belt at the time of replacement of the upper and lower corrugating rolls.

Therefore, at the time of the replacement of the upper and lower corrugating rolls, the belt support member provided at the replacement carriage blocks the lowering of the pressurizing belt, and therefore, when the upper and lower corrugating rolls are removed from the single facer and when the upper and lower corrugating rolls are mounted to the single facer, the contact between the upper and lower corrugating rolls and the pressurizing belt can be prevented, and thus damage to the pressurizing belt can be prevented.

In the corrugating roll unit replacing apparatus according to the present invention, the belt support member is disposed along the replacement direction, and inclined guide surfaces inclined toward the lower side in a vertical direction are provided on an upper surface of an end portion on one side in the replacement direction of the belt support member and an upper surface of an end portion on the other side in the replacement direction of the belt support member.

Therefore, since the inclined guide surface is provided on the upper surface of each end portion of the belt support member, when the belt support member moves in the replacement direction to support the pressurizing belt, the belt support member can appropriately support the pressurizing belt without the contact between the end portion of the belt support member and the end surface of the pressurizing belt.

In the corrugating roll unit replacing apparatus according to the present invention, the belt support member is disposed along the replacement direction, and guide rollers are provided at an upper end portion on one side in the replacement direction of the belt support member and an upper end portion on the other side in the replacement direction of the belt support member.

Therefore, since the guide roller is provided at each end portion of the belt support member, when the belt support member supports and moves the pressurizing belt, the frictional resistance between the belt support member and the pressurizing belt is reduced by the guide roller, and thus damage to the pressurizing belt can be prevented.

In the corrugating roll unit replacing apparatus according to the present invention, a belt retaining member that blocks a shift of the pressurizing belt in the replacement direction at the time of replacement of the upper and lower corrugating rolls is provided.

Therefore, since the belt retaining member that blocks the shift of the pressurizing belt at the time of the replacement of the upper and lower corrugating rolls is provided, when the upper and lower corrugating rolls are removed from the single facer and when the upper and lower corrugating rolls are mounted to the single facer, it is possible to block the shift of the pressurizing belt and prevent damage to the pressurizing belt.

Further, according to another aspect of the present invention, there is provided a corrugating roll unit replacing method of performing an operation of replacing a corrugating roll unit between a single facer and a corrugating roll unit transporting carriage, the method including: a step of connecting a replacement carriage that is at a retreat position to the corrugating roll unit mounted to the single facer; a step of removing the corrugating roll unit from the single facer by moving the replacement carriage along a direction of removing the corrugating roll unit; a step of releasing a connection between the replacement carriage and the removed corrugating roll unit and connecting the replacement carriage and the corrugating roll unit mounted on the corrugating roll unit transporting carriage; a step of mounting the corrugating roll unit mounted on the corrugating roll unit transporting carriage to the single facer by moving the replacement carriage along a direction of mounting the corrugating roll unit; and a step of releasing a connection between the replacement carriage and the mounted corrugating roll unit and moving the replacement carriage to the retreat position.

Therefore, it is not necessary to provide a movement unit at the corrugating roll unit transporting carriage, and thus the simplification of a structure and a cost reduction can be attained.

Advantageous Effects of Invention

According to the corrugating roll unit replacing apparatus and method of the present invention, it is not necessary to provide a movement unit at the mounting base, and thus the simplification of a structure and a cost reduction can be attained.

DESCRIPTION OF EMBODIMENTS

Hereinafter, a preferred embodiment of a corrugating roll unit replacing apparatus and method according to the present invention will be described in detail with reference to the accompanying drawings. The present invention is not limited to this embodiment, and in a case where there are a plurality of embodiments, the present invention also includes configurations made by combining the respective embodiments.

Figure 1:
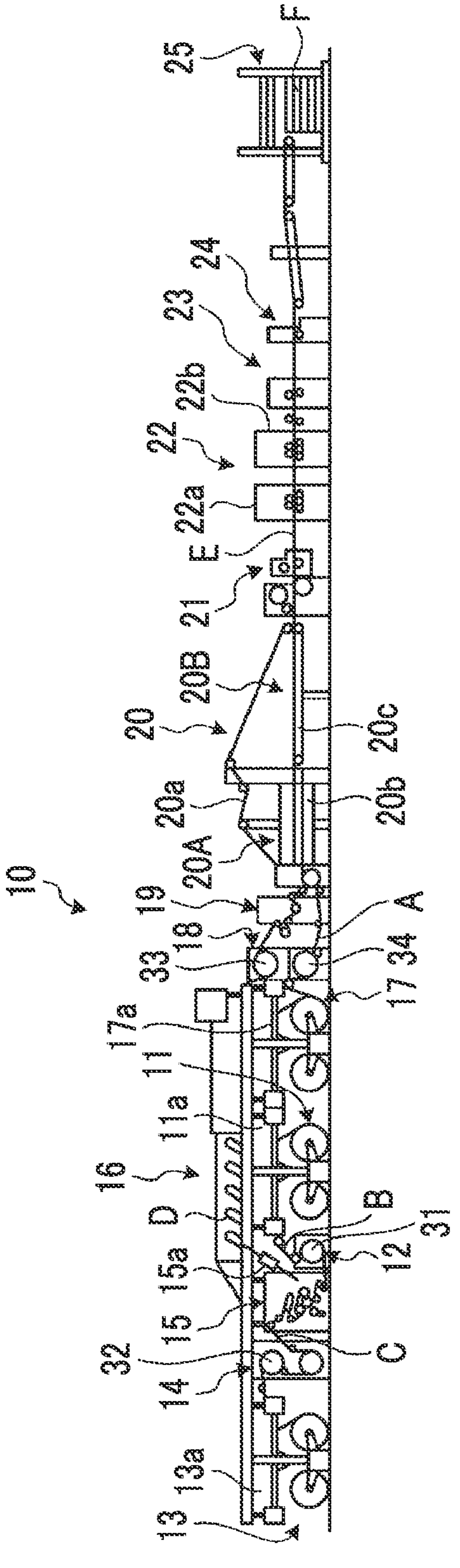
FIG. 1 is a schematic diagram showing a corrugating machine as a cardboard sheet manufacturing apparatus.

FIG. 1 is a schematic diagram showing a corrugating machine as a cardboard sheet manufacturing apparatus.

As shown in FIG. 1, a corrugating machine 10 as a cardboard sheet manufacturing apparatus is for manufacturing a single-faced cardboard sheet D by bonding a top liner C to a corrugated medium B, manufacturing a double-faced cardboard sheet E by bonding a bottom liner A to the medium B side of the manufactured single-faced cardboard sheet D, and manufacturing a sheet-like double-faced cardboard sheet F by cutting the continuous double-faced cardboard sheet E to a predetermined length.

The corrugating machine 10 includes a mill roll stand 11 and a preheater 12 for the medium B, a mill roll stand 13 and a preheater 14 for the top liner C, a single facer 15, a bridge 16, a mill roll stand 17 and a preheater 18 for the bottom liner A, a glue machine 19, a double facer 20, a rotary shear 21, a slitter scorer 22, a cutoff 23, a defective sheet rejecting device 24, and a stacker 25.

In the mill roll stand 11, rolls of paper, in each of which the medium B is wound in a roll shape, are respectively mounted on both sides, and a splicer 11*a* which performs paper splicing is provided on the upper side thereof. When the remaining of the roll of paper on one side is a small amount, the splicer 11*a* performs paper splicing of the roll of paper on the other side, so that the medium B can be continuously fed toward the downstream side from the mill roll stand 11.

In the mill roll stand 13, rolls of paper, in each of which the top liner C is wound in a roll shape, are respectively mounted on both sides, and a splicer 13*a* which performs paper splicing is provided on the upper side thereof. When the remaining of the roll of paper on one side is a small amount, the splicer 13*a* performs paper splicing of the roll of paper on the other side, so that the top liner C can be continuously fed toward the downstream side from the mill roll stand 13.

The preheaters 12 and 14 preheat the medium B and the top liner C, respectively. The preheaters 12 and 14 have preheating rolls 31 and 32 in which steam is supplied to the interior thereof, and transport the medium B and the top liner C, which are continuously fed from the mill roll stands 11 and 13, while heating them by the preheating rolls 31 and 32, so that the medium B and the top liner C are heated to a predetermined temperature.

The single facer 15 forms the single-faced cardboard sheet D by processing the medium B heated by the preheater 12 into a wave shape, then applying an adhesive to a top portion of each corrugation, and bonding the top liner C heated by the preheater 14 to the corrugated medium B. In the single facer 15, a pickup conveyor 15*a* is provided obliquely upward on the downstream side in a transfer direction. The pickup conveyor 15*a* is composed of a pair of endless belts and clamps the single-faced cardboard sheet D formed in the single facer 15 to transport it to the bridge 16. The bridge 16 temporarily retains the single-faced cardboard sheet D in order to absorb a difference in speed between the single facer 15 and the double facer 20.

In the mill roll stand 17, rolls of paper, in each of which the bottom liner A is wound in a roll shape, are respectively mounted on both sides, and a splicer 17*a* which performs paper splicing is provided on the upper side thereof. When the remaining of the roll of paper on one side is a small amount, the splicer 17*a* performs paper splicing of the roll of paper on the other side, so that the bottom liner A can be continuously fed toward the downstream side from the mill roll stand 17.

The preheater 18 preheats each of the single-faced cardboard sheet D and the bottom liner A. The preheater 18 has preheating rolls 33 and 34 in which steam is supplied to the interior thereof, and transports the single-faced cardboard sheet D and the bottom liner A, which is continuously fed from the mill roll stand 17, while heating them by the preheating rolls 33 and 34, so that the single-faced cardboard sheet D and the bottom liner A are heated to a predetermined temperature.

The glue machine 19 has adhesive equipment. The single-faced cardboard sheet D heated by the preheating roll 33 is guided into the glue machine 19 on the way, and when the single-faced cardboard sheet D passes between a rider roll and an adhesive applicator roll, an adhesive is applied to a top portion of each of the corrugations of the medium B. The single-faced cardboard sheet D with an adhesive applied thereto by the glue machine 19 is transferred to the double facer 20. Further, the bottom liner A heated by the preheating roll 34 is also transferred to the double facer 20 through the glue machine 19.

The double facer 20 is divided into a heating section 20A on the upstream side and a cooling section 20B on the downstream side along a traveling line of the single-faced cardboard sheet D and the bottom liner A. The single-faced cardboard sheet D with an adhesive applied thereto by the glue machine 19 is carried in between a pressurizing belt 20*a* and a hot plate 20*b* in the heating section 20A, and the bottom liner A is carried in between the pressurizing belt 20*a* and the hot plate 20*b* so as to overlap the medium B side of the single-faced cardboard sheet D. The single-faced cardboard sheet D and the bottom liner A are carried in between the pressurizing belt 20*a* and the hot plate 20*b*, and then integrated in a state of being overlapped up and down, and transferred toward the cooling section 20B. During this transfer, the single-faced cardboard sheet D and the bottom liner A are heated while being pressurized, so that they are bonded to each other to form the continuous double-faced cardboard sheet E. The double-faced cardboard sheet E is naturally cooled in the cooling section 20B when being clamped and transported by the pressurizing belt 20*a* and a transport belt 20*c*, and transferred to the rotary shear 21.

The rotary shear 21 cuts the entire width or a part of the double-faced cardboard sheet E in the width direction before the bonding is stabilized in an operation initial stage. The slitter scorer 22 cuts the wide double-faced cardboard sheet E along the transfer direction so as to have a predetermined width, and forms creasing lines extending in the transfer direction. The slitter scorer 22 is composed of a first slitter scorer unit 22*a* and a second slitter scorer unit 22*b* having substantially the same structure, which are arranged along the transfer direction of the double-faced cardboard sheet E. Each of the first slitter scorer unit 22*a* and the second slitter scorer unit 22*b* has a plurality of sets of upper creasing line rolls and lower creasing line rolls, which are disposed to face each other with the double-faced cardboard sheet E interposed therebetween, in the width direction, and has a plurality of sets of slitter knives, which are disposed on the lower side of the double-faced cardboard sheet E, in the width direction.

The cutoff 23 cuts the double-faced cardboard sheet E cut in the transfer direction by the slitter scorer 22, along the width direction, to form a plate-shaped double-faced cardboard sheet F having a predetermined length. The defective sheet rejecting device 24 rejects the double-faced cardboard sheet F determined to be a defective sheet by a defect detection device from a transport line. The stacker 25 stacks the non-defective double-faced cardboard sheets F and discharges them as products to the outside of the machine.

Figure 2:
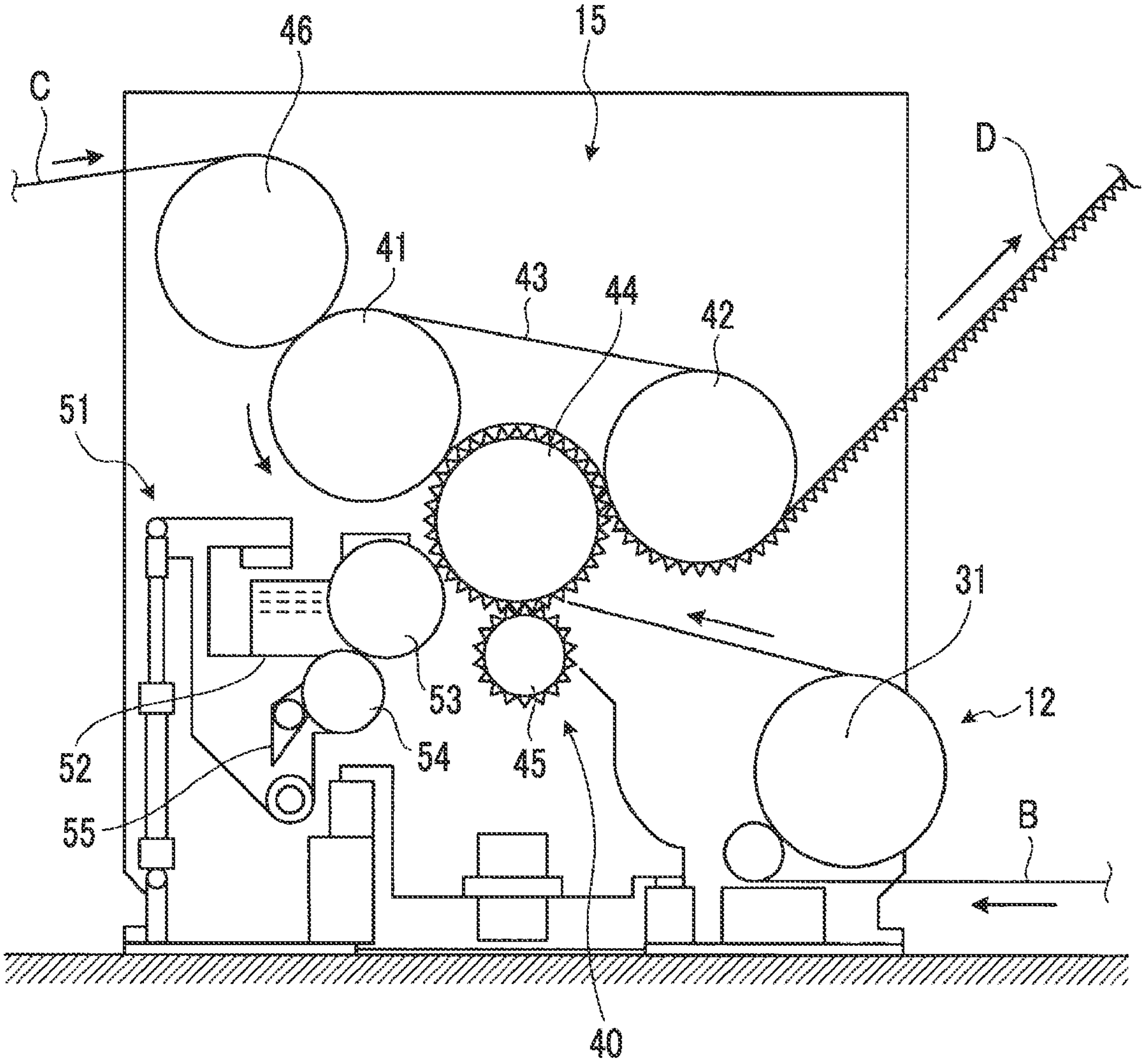
FIG. 2 is a schematic configuration diagram showing a single facer.

Here, the single facer 15 will be described in detail. FIG. 2 is a schematic configuration diagram showing the single facer.

As shown in FIG. 2, the single facer 15 includes a belt roll 41, a tension roll 42, a pressurizing belt 43, an upper corrugating roll 44, and a lower corrugating roll 45.

The belt roll 41 can be driven and rotated by a drive device (not shown). The tension roll 42 is rotatably supported with a predetermined interval between itself and the belt roll 41. The pressurizing belt 43 is an endless belt and is wound around the belt roll 41 and the tension roll 42. The upper corrugating roll 44 can be driven and rotated by a drive device (not shown), and the outer peripheral surface thereof is formed in a wave shape. The upper corrugating roll 44 is disposed below the pressurizing belt 43 between the belt roll 41 and the tension roll 42, and the outer peripheral surface having a wave shape is in contact with the lower surface of the pressurizing belt 43 in a pressurized state. The lower corrugating roll 45 has an outer peripheral surface formed in a wave shape, similar to the upper corrugating roll 44, and meshes with the outer peripheral surface of the lower corrugating roll 45 below the upper corrugating roll 44.

Therefore, the top liner C is wound around a guide roll 46 and then transferred to the nip portion between the pressurizing belt 43 and the upper corrugating roll 44 together with the pressurizing belt 43 that is guided by the belt roll 41. On the other hand, the medium B is processed into a wave shape at the meshing portion between the upper corrugating roll 44 and the lower corrugating roll 45, and then guided by the upper corrugating roll 44 to be transferred to the nip portion between the pressurizing belt 43 and the upper corrugating roll 44.

Further, the single facer 15 is provided with adhesive equipment 51. The adhesive equipment 51 is disposed in the vicinity of the upper corrugating roll 44. The adhesive equipment 51 includes an adhesive dam 52, an adhesive applicator roll 53, a meter roll 54, and an adhesive scraping blade 55.

The adhesive dam 52 stores a predetermined amount of glue. The adhesive applicator roll 53 sticks the adhesive stored in the adhesive dam 52 to the medium B that is transported by the upper corrugating roll 44 to perform adhesive application. The meter roll 54 is in contact with the outer peripheral surface of the adhesive applicator roll 53 and rotates synchronously with the adhesive applicator roll 53 to adjust the amount of adhesive stuck to the outer peripheral surface of the adhesive applicator roll 53. The adhesive scraping blade 55 is in contact with the outer peripheral surface of the meter roll 54 to scrape off excess adhesive which is removed from the adhesive applicator roll 53 and stuck to the outer peripheral surface of the meter roll 54.

Therefore, the adhesive stored in the adhesive dam 52 is stuck to the rotating adhesive applicator roll 53, and the amount of adhesive stuck to the outer peripheral surface is adjusted by the meter roll 54. In the medium B processed into a wave shape at the meshing portion between the upper corrugating roll 44 and the lower corrugating roll 45, an adhesive is applied to the top portion of each corrugation by the adhesive applicator roll 53. When the medium B with an adhesive applied thereto is transferred to the nip portion of the pressurizing belt 43 and the upper corrugating roll 44, it is bonded to the top liner C, whereby the single-faced cardboard sheet D is formed.

All the belt roll 41, the tension roll 42, the upper corrugating roll 44, and the lower corrugating roll 45 are heated by steam which flows in the interior thereof. Therefore, the top liner C is heated when it comes into contact with the belt roll 41 and the tension roll 42 through the pressurizing belt 43. The medium B is heated when it is processed into a wave shape by being pressurized at the meshing portion between the upper corrugating roll 44 and the lower corrugating roll 45. Further, the medium B is heated from this meshing portion until it overlaps the top liner C by the pressurizing belt 43 and the upper corrugating roll 44. In the medium B, an adhesive is applied to the top portion of each corrugation by the adhesive applicator roll 53 while the medium B is heated, and the medium B is transferred to the nip portion between the pressurizing belt 43 and the upper corrugating roll 44. Here, the top liner C is pressurized and joined to the medium B. The adhesive is solidified due to an adhesive force being increased by receiving a predetermined amount of heat, and the medium B and the top liner C are bonded to each other due to the adhesive receiving heat and solidifying, and the single-faced cardboard sheet D is formed.

Further, although not shown in the drawings, a pressurizing force adjusting device capable of adjusting a pressurizing force to the medium B and the top liner C by the upper corrugating roll 44 and the pressurizing belt 43 is provided. The pressurizing force adjusting device has a hydraulic cylinder, and a tip portion of a drive rod thereof is connected to a supporting shaft of the tension roll 42. Therefore, the tension of the pressurizing belt 43 is adjusted by moving the tension roll 42 toward and away from the belt roll 41 by the hydraulic cylinder, and thus the pressurizing force to the medium B and the top liner C which are transported between the upper corrugating roll 44 and the pressurizing belt 43 can be adjusted.

In the single facer 15 configured in this manner, it is necessary to form a plurality of types of mediums B having different wave shapes, and therefore, a plurality of types of upper and lower corrugating rolls 44 and 45 are provided according to the types of the mediums B to be formed. A corrugating roll unit 40 composed of the upper corrugating roll 44, the lower corrugating roll 45, and the like can be replaced with respect to the single facer 15. The corrugating roll unit 40 is composed of the upper corrugating roll 44, the lower corrugating roll 45, the adhesive equipment 51, and the like.

Figure 3:
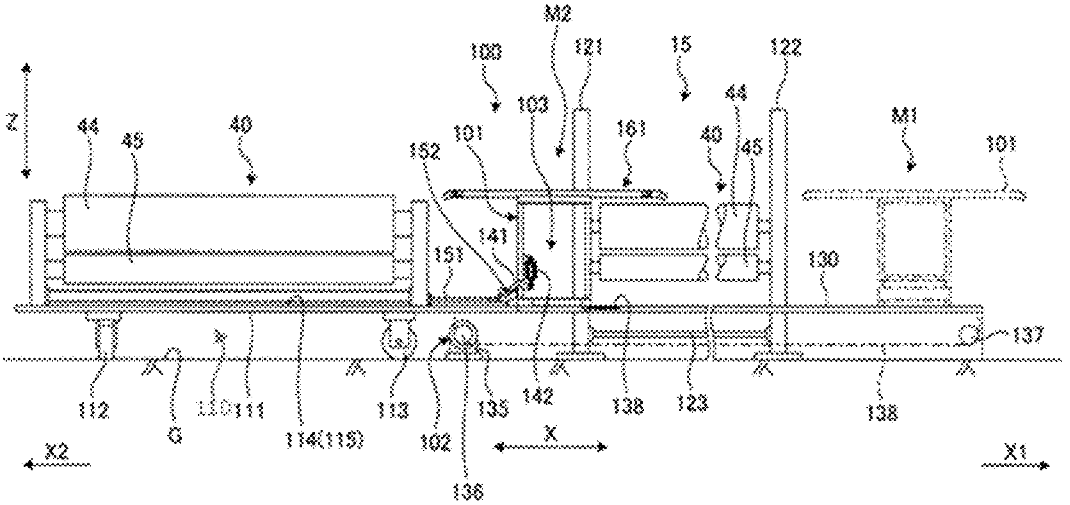
FIG. 3 is a schematic diagram showing a corrugating roll unit replacing apparatus of the present embodiment.

Hereinafter, the corrugating roll unit replacing apparatus of the present embodiment will be described. FIG. 3 is a schematic diagram showing the corrugating roll unit replacing apparatus of the present embodiment. In the following description, a first horizontal direction, which is a replacement direction of the corrugating roll unit, is set to be an X direction, a second horizontal direction intersecting the X direction that is the first horizontal direction is set to be a Y direction, and the vertical direction intersecting the X direction and the Y direction is set to be a Z direction. Although the X direction and the Y direction are set to be a horizontal direction, the X direction and the Y direction may have a predetermined inclination angle with respect to the horizontal direction. Further, the replacement direction of the corrugating roll unit is the X direction which is the first horizontal direction. However, a mounting direction of the corrugating roll unit is set to be an X1 direction, and a removal direction of the corrugating roll unit is set to be an X2 direction.

As shown in FIG. 3, a corrugating roll unit replacing apparatus 100 is for performing an operation of replacing the corrugating roll unit 40 between the single facer 15 and a corrugating roll unit transporting carriage 110. The corrugating roll unit replacing apparatus 100 includes a replacement carriage 101, a movement unit 102, and a connection device 103.

Figure 4:
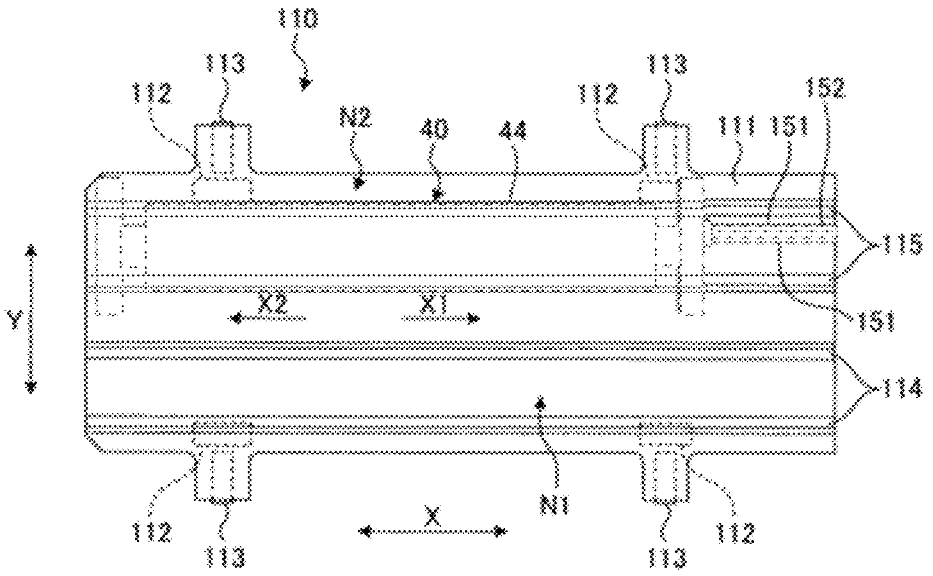
FIG. 4 is a plan view showing a corrugating roll unit transporting carriage.

First, the corrugating roll unit transporting carriage 110 will be described in detail. FIG. 4 is a plan view showing the corrugating roll unit transporting carriage, and FIG. 5 is a side view showing the corrugating roll unit transporting carriage.

Figure 5:
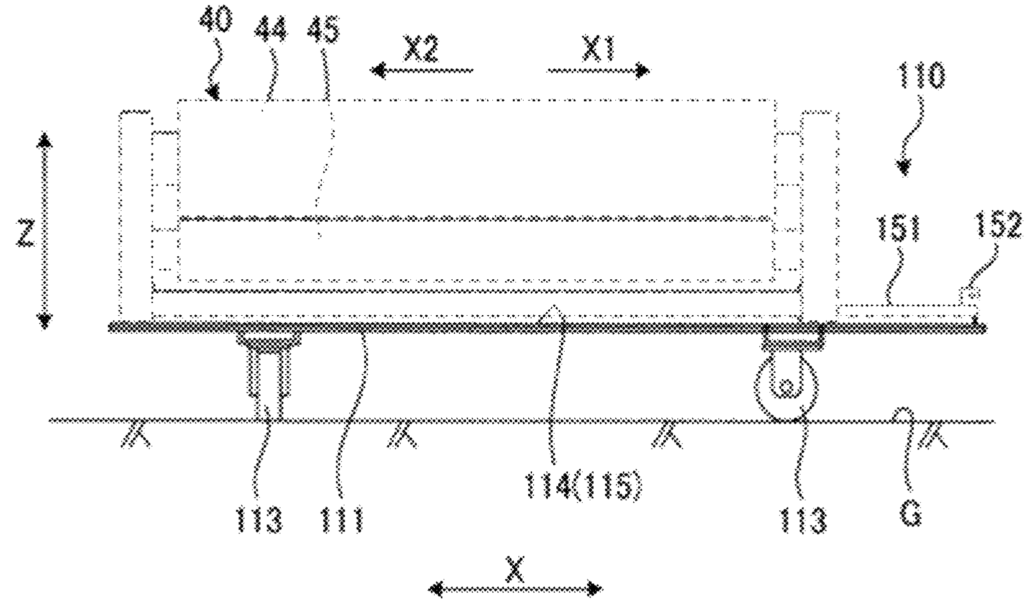
FIG. 5 is a side view showing the corrugating roll unit transporting carriage.

As shown in FIGS. 4 and 5, the corrugating roll unit transporting carriage 110 includes a mounting base 111, a first wheel 112, and a second wheel 113. The mounting base 111 can accommodate the corrugating roll unit 40 mounted thereon.

The mounting base 111 has a rectangular plate shape and has a first accommodation portion N1 that accommodates the corrugating roll unit 40 that is removed from the single facer 15, and a second accommodation portion N2 that accommodates the corrugating roll unit 40 to be mounted to the single facer 15. The mounting base 111 has a pair of guide rails 114 and 115 provided on the upper surface portion thereof to support the corrugating roll unit 40 to be movable along the X direction to the first accommodation portion N1 and the second accommodation portion N2, respectively.

The mounting base 111 is provided with four first wheels 112 and four second wheels 113 on the lower surface thereof. The first wheels 112 can be driven and rotated by a first drive device (not shown), and the second wheels 113 can be driven and rotated by a second drive device (not shown). Further, the second wheels 113 can be moved along the Z direction by a lifting device (not shown).

Therefore, when the second wheels 113 are raised by the lifting device, the second wheels 113 are separated from a floor surface G, while the first wheels 112 are grounded on the floor surface G. In this state, when the first wheels 112 are driven and rotated by the first drive device, the mounting base 111 can be moved along the X direction, which is the replacement direction of the corrugating roll unit 40. Further, when the second wheels 113 are lowered by the lifting device, the second wheels 113 are grounded on the floor surface G, while the first wheels 112 are separated from the floor surface G. In this state, when the second wheels 113 are driven and rotated by the second drive device, the mounting base 111 can be moved along the Y direction intersecting the replacement direction of the corrugating roll unit 40.

The corrugating roll unit transporting carriage 110 is not limited to the configuration described above, as long as it can move in the X direction and the Y direction.

Figure 6:
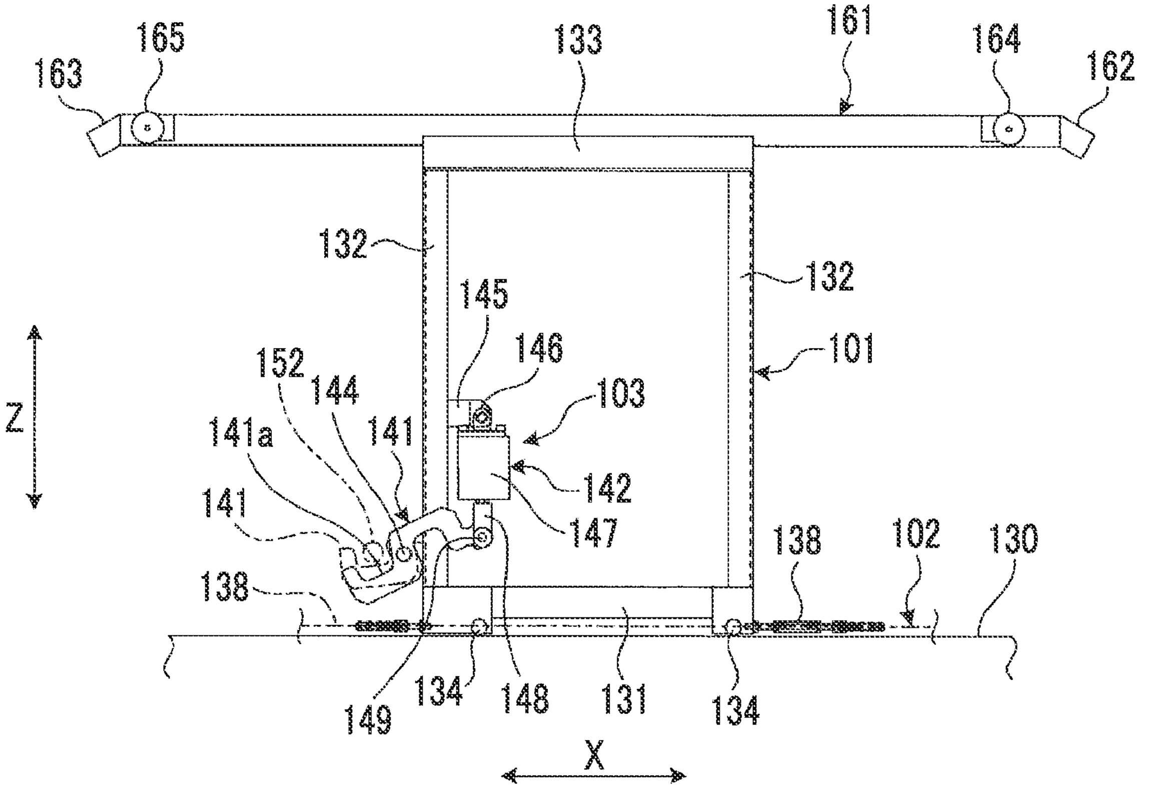
FIG. 6 is a side view showing the corrugating roll unit replacing apparatus.

Next, the corrugating roll unit replacing apparatus 100 will be described in detail. FIG. 6 is a side view showing the corrugating roll unit replacing apparatus, FIG. 7 is a plan view showing the corrugating roll unit replacing apparatus, and FIG. 8 is a front view showing the corrugating roll unit replacing apparatus.

Figure 7:
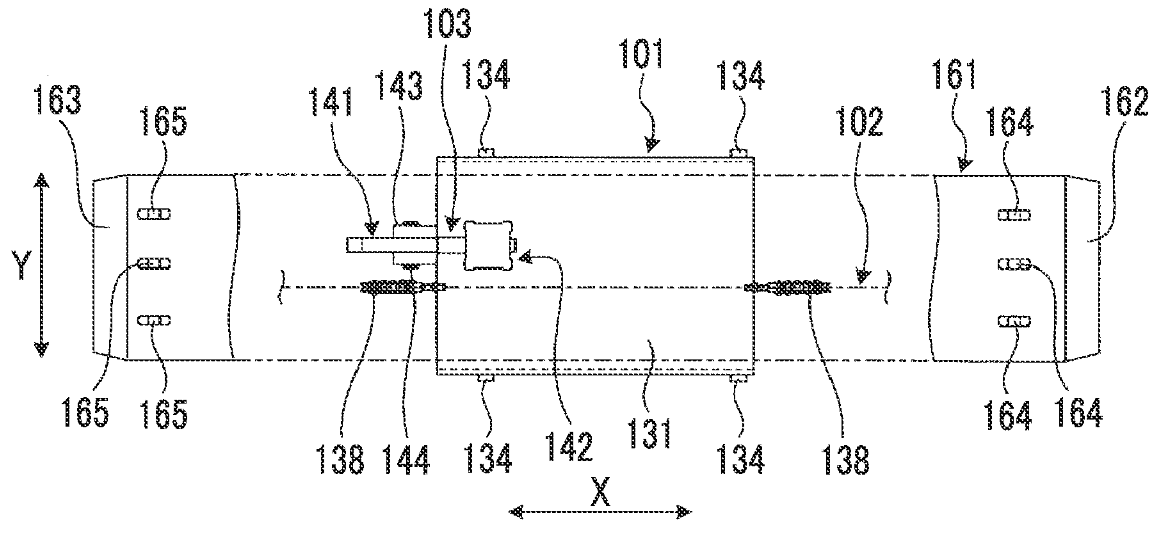
FIG. 7 is a plan view showing the corrugating roll unit replacing apparatus.
Figure 8:
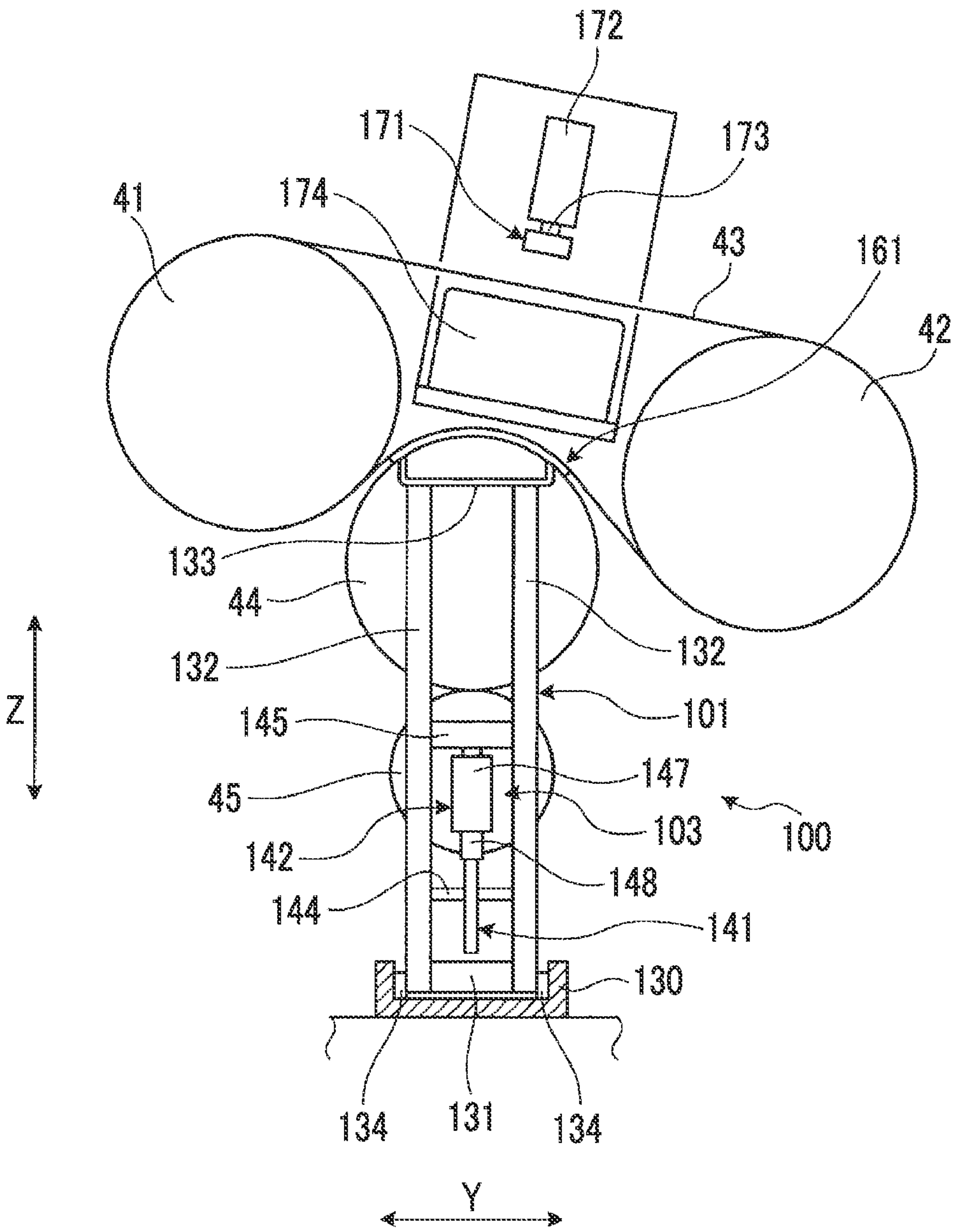
FIG. 8 is a front view showing the corrugating roll unit replacing apparatus.

As shown in FIGS. 3, 6, and 7, the corrugating roll unit replacing apparatus 100 includes the replacement carriage 101, the movement unit 102, and the connection device 103. In the single facer 15, a pair of frames 121 and 122 is installed on the floor surface G at a predetermined interval and connected to each other by a connecting beam 123. The corrugating roll unit 40 is disposed and supported between the pair of frames 121 and 122. The single facer 15 has the belt roll 41, the tension roll 42, the pressurizing belt 43, and the like, in addition to the corrugating roll unit 40 (the upper corrugating roll 44 and the lower corrugating roll 45). However, they are omitted in FIG. 3.

A pair of guide rails 130 is disposed along the X direction which is the replacement direction of the corrugating roll unit 40. The pair of guide rails 130 has the same height and width as the pair of guide rails 114 and 115 provided on the mounting base 111 of the corrugating roll unit transporting carriage 110. That is, when the corrugating roll unit transporting carriage 110 approaches the single facer 15, the pair of guide rails 130 can be disposed in series with the pair of guide rails 114 or the pair of guide rails 115 of the corrugating roll unit transporting carriage 110. Therefore, the corrugating roll unit 40 can be moved between the pair of guide rails 130 and the pair of guide rails 114 and 115.

The replacement carriage 101 is supported to be movable along the X direction by the pair of guide rails 130. The replacement carriage 101 has a carriage main body 131, four frames 132, and an upper beam 133. The carriage main body 131 is provided with four wheels 134 and is supported to be movable along the pair of guide rails 130 by the four wheels 134. In the carriage main body 131, the frames 132 are fixed at the four corners along the Z direction, and the upper beams 133 are fixed to the upper end portions of the four frames 132.

The movement unit 102 can move the replacement carriage 101 in the X direction along the pair of guide rails 130. The movement unit 102 is disposed below the guide rails 130. The movement unit 102 includes a drive motor 135, a drive sprocket 136, a driven sprocket 137, and a chain 138. The drive motor 135 is disposed below one side in the longitudinal direction of the guide rail 130, and the drive sprocket 136 is fixed to a drive shaft thereof. The driven sprocket 137 is disposed below the other side in the longitudinal direction of the guide rail 130 and is rotatably supported. The chain 138 is wound around the drive sprocket 136 and the driven sprocket 137, one end portion thereof is connected to one end portion in the moving direction of the replacement carriage 101 through a sprocket (not shown), and the other end portion is connected to the other end portion in the moving direction of the replacement carriage 101 through a sprocket (not shown).

Further, a retreat space M1 for the replacement carriage 101 is provided on one side in the X direction of the single facer 15, and a connection space M2 for the replacement carriage 101 is provided on the other side in the X direction of the single facer 15. Therefore, when the drive motor 135 is driven, the drive sprocket 136 is driven and rotated, and the chain 138 moves in the longitudinal direction, so that the replacement carriage 101 can be moved along the pair of guide rails 130. At this time, the replacement carriage 101 can move between the retreat space M1 and the connection space M2.

The connection device 103 is for connecting the replacement carriage 101 and the corrugating roll unit 40. The connection device 103 is provided at the replacement carriage 101 and has a locking hook 141 and a drive device 142. In the replacement carriage 101, an attachment bracket 143 is fixed to the frame 132, and an intermediate portion in the longitudinal direction of the locking hook 141 is rotatably supported on the attachment bracket 143 by a supporting shaft 144. The locking hook 141 has an S shape and is supported by the supporting shaft 144 extending along the Y direction, to be disposed such that a locking recessed portion 141*a* formed at one end portion thereof faces upward in the Z direction. In the replacement carriage 101, an attachment bracket 145 is fixed to the frame 132, and one end portion of the drive device 142 is supported on the attachment bracket 143 by a supporting shaft 146. The drive device 142 is a fluid pressure cylinder (for example, an air cylinder or a hydraulic cylinder) 147, and the tip portion of a drive rod 148 extending downward is rotatably connected to the other end portion of the locking hook 141 by a connection shaft 149.

On the other hand, as shown in FIGS. 4 and 5, a locking pin 152 extending along the Y direction is fixed to the end portion in the mounting direction X1 of the corrugating roll unit 40 through a bracket 151. The locking hook 141 of the connection device 103 can be locked to the locking pin 152 of the corrugating roll unit 40.

Therefore, as shown in FIG. 6, when the drive device 142 is driven, the locking hook 141 is rotated to be able to be moved to a locking position (a two-dot chain line position in FIG. 6) where the locking hook 141 is locked to the locking pin 152 of the corrugating roll unit 40 and a release position (a solid line position in FIG. 6) where the locking with the locking pin 152 is released. That is, when the locking hook 141 is at the release position, if the drive rod 148 is extended by the fluid pressure cylinder 147, the locking hook 141 rotates in the clockwise direction in FIG. 6. Then, the locking hook 141 moves to the locking position where the locking recessed portion 141*a* is raised to be locked to the locking pin 152 of the corrugating roll unit 40.

Then, when the locking hook 141 is at the locking position where the locking hook 141 is locked to the locking pin 152, the connection device 103 integrally connects the replacement carriage 101 and the corrugating roll unit 40. When the movement unit 102 moves the replacement carriage 101 in the X direction, the corrugating roll unit 40 can be moved in the X direction together with the replacement carriage 101. That is, the replacement carriage 101 can pull the corrugating roll unit 40 through the locking hook 141 to move it in the mounting direction X1, and push the corrugating roll unit 40 through the locking hook 141 to move it in the removal direction X2.

As shown in FIGS. 6 to 8, the replacement carriage 101 is provided with a belt support member 161 that blocks the lowering of the pressurizing belt 43 at the time of the replacement of the corrugating roll unit 40 (the upper corrugating roll 44 and the lower corrugating roll 45). The belt support member 161 is disposed along the X direction, has a plate shape having a predetermined width in the Y direction, and is fixed to an upper end portion of the replacement carriage 101. The belt support member 161 is longer than the replacement carriage 101 in the X direction, and the respective end portions thereof in the longitudinal direction extend forward and backward from the respective end portions of the replacement carriage 101. The belt support member 161 is provided with inclined guide surfaces 162 and 163 inclined downward in the vertical direction on the upper surface of the end portion on one side in the X direction and the upper surface of the end portion on the other side, respectively. That is, the upper surface of each end portion in the X direction of the belt support member 161 is inclined downward by each of the inclined guide surfaces 162 and 163. Further, the belt support member 161 is provided with a plurality of guide rollers 164 and 165 at the upper end portion on one side and the upper end portion on the other side in the X direction, respectively. That is, in the belt support member 161, the plurality of guide rollers 164 and 165 protrude upward at the respective end portions in the X direction.

Further, as shown in FIG. 8, the corrugating roll unit replacing apparatus 100 is provided with a belt retaining member 171 that blocks a shift of the pressurizing belt 43 in the width direction (the X direction) at the time of the replacement of the corrugating roll unit 40 (the upper corrugating roll 44 and the lower corrugating roll 45). In the single facer 15, a fluid pressure cylinder (for example, an air cylinder or a hydraulic cylinder) 172 is fixed to a frame (not shown), and the belt retaining member 171 is fixed to the tip portion of a drive rod 173 extending downward, of the fluid pressure cylinder 172. The belt retaining member 171 is disposed on one end portion side in the width direction of the pressurizing belt 43 and above the pressurizing belt 43 supported by the belt roll 41 and the tension roll 42. Further, in the single facer 15, a support member 174 is fixed to a frame (not shown). The support member 174 is disposed on the one end portion side in the width direction of the pressurizing belt 43 and inside the pressurizing belt 43 supported by the belt roll 41 and the tension roll 42. That is, the support member 174 is disposed below the pressurizing belt 43 on the upper side, which is driven between the belt roll 41 and the tension roll 42, and the belt retaining member 171 and the support member 174 face each other with the pressurizing belt 43 interposed therebetween.

Here, a method of replacing the corrugating roll unit by the corrugating roll unit replacing apparatus 100 of the present embodiment will be described.

The method of replacing the corrugating roll unit by the corrugating roll unit replacing apparatus 100 of the present embodiment includes a step of connecting the replacement carriage 101 that is at the retreat position to the corrugating roll unit 40 mounted to the single facer 15, a step of removing the corrugating roll unit 40 from the single facer 15 by moving the replacement carriage 101 along the removal direction X2 of the corrugating roll unit 40, a step of releasing the connection between the replacement carriage 101 and the removed corrugating roll unit 40 and connecting the replacement carriage 101 and the corrugating roll unit 40 mounted on the corrugating roll unit transporting carriage 110, a step of mounting the corrugating roll unit 40 mounted on the corrugating roll unit transporting carriage 110 to the single facer 15 by moving the replacement carriage 101 along the mounting direction X1 of the corrugating roll unit 40, and a step of releasing the connection between the replacement carriage 101 and the mounted corrugating roll unit 40 and moving the replacement carriage 101 to the retreat position.

As shown in FIGS. 4 and 5, in the corrugating roll unit transporting carriage 110, the first accommodation portion N1 of the mounting base 111 is empty, and the corrugating roll unit 40 to be newly mounted is accommodated in the second accommodation portion N2. As shown in FIG. 3, first, an operator moves the corrugating roll unit transporting carriage 110 in the X direction and stops it at a position close to the single facer 15. Next, the operator moves the corrugating roll unit transporting carriage 110 in the Y direction and stops it at a first replacement position where the first accommodation portion N1 of the mounting base 111 faces the existing corrugating roll unit 40.

The first replacement position is a position where the first accommodation portion N1 of the mounting base 111 of the corrugating roll unit transporting carriage 110 faces the existing corrugating roll unit 40 in the X direction, the Y direction, and the Z direction. At this time, the pair of guide rails 114 of the corrugating roll unit transporting carriage 110 is disposed in series with the pair of guide rails 130 of the corrugating roll unit replacing apparatus 100.

At the first replacement position, the movement unit 102 moves the replacement carriage 101 that is at the retreat position (the position of a two-dot chain line in FIG. 3) in the removal direction X2 along the guide rail 130 to approach the single facer 15. Here, the connection device 103 is operated to connect the replacement carriage 101 and the corrugating roll unit 40 mounted to the single facer 15 by the locking hook 141. Then, the movement unit 102 further moves the replacement carriage 101 along the removal direction X2 of the corrugating roll unit 40. Then, the replacement carriage 101 pushes and moves the corrugating roll unit 40, the corrugating roll unit 40 is removed from the single facer 15, moved to the corrugating roll unit transporting carriage 110 along the guide rails 130 and 114, and accommodated in the first accommodation portion N1. When the corrugating roll unit 40 is accommodated in the corrugating roll unit transporting carriage 110, the connection device 103 is operated to release the connection between the replacement carriage 101 and the corrugating roll unit 40 by the locking hook 141.

When the replacement carriage 101 moves the corrugating roll unit 40 in the single facer 15 and discharges the corrugating roll unit 40 to the outside of the single facer 15, as shown in FIG. 8, the belt support member 161 blocks the lowering of the pressurizing belt 43. That is, when the replacement carriage 101 approaches the single facer 15 by the movement unit 102, the tip portion of the belt support member 161 enters between the pressurizing belt 43 and the upper corrugating roll 44 to support the pressurizing belt 43. At this time, the belt support member 161 is provided with the inclined guide surface 163 at the tip portion thereof, as shown in FIG. 6, and therefore, the belt support member 161 lifts the pressurizing belt 43 and smoothly enters between the pressurizing belt 43 and the upper corrugating roll 44. Further, since the plurality of guide rollers 164 and 165 protrude at the upper portion of the belt support member 161, the frictional resistance with respect to the pressurizing belt 43 is reduced and the pressurizing belt 43 can be appropriately supported. Then, as shown in FIG. 3, even after the corrugating roll unit 40 is discharged from the single facer 15, the belt support member 161 supports the pressurizing belt 43 to block the lowering thereof.

Further, as shown in FIG. 8, the belt retaining member 171 blocks a shift of the pressurizing belt 43 in the X direction. That is, when the replacement carriage 101 moves in the removal direction X2 and approaches the single facer 15 and the tip portion of the belt support member 161 enters between the pressurizing belt 43 and the upper corrugating roll 44, the fluid pressure cylinder 172 is operated, and thus the belt retaining member 171 is lowered together with the drive rod 173, and the pressurizing belt 43 is clamped by the belt retaining member 171 and the support member 174. Therefore, thereafter, even if the replacement carriage 101 moves and removes the corrugating roll unit 40 in the single facer 15, the pressurizing belt 43 is retained by the belt retaining member 171, and therefore, the pressurizing belt 43 is not shifted in the removal direction X2 together with the corrugating roll unit 40.

When the existing corrugating roll unit 40 is accommodated in the first accommodation portion N1 of the mounting base 111, the operator moves the corrugating roll unit transporting carriage 110 in the Y direction, and the second accommodation portion N2 of the mounting base 111 stops at a second replacement position where it faces the empty space where the existing corrugating roll unit 40 has been removed.

The second replacement position is a position where the second accommodation portion N2 of the mounting base 111 of the corrugating roll unit transporting carriage 110 faces the empty space where the existing corrugating roll unit 40 has been removed, in the X direction, the Y direction, and the Z directions. At this time, the pair of guide rails 115 of the corrugating roll unit transporting carriage 110 is disposed in series with the pair of guide rails 130 of the corrugating roll unit replacing apparatus 100.

At the second replacement position, the connection device 103 is operated, and the replacement carriage 101 and the corrugating roll unit 40 accommodated in the second accommodation portion N2 of the corrugating roll unit transporting carriage 110 are connected by the locking hook 141. Then, the movement unit 102 moves the replacement carriage 101 along the mounting direction X1 of the corrugating roll unit 40. Then, the replacement carriage 101 pulls and moves the corrugating roll unit 40, and the corrugating roll unit 40 moves from the corrugating roll unit transporting carriage 110 to the single facer 15 along the guide rails 115 and 130 and mounted to the single facer 15.

When the replacement carriage 101 moves the corrugating roll unit 40 which is at the corrugating roll unit transporting carriage 110, and moves the corrugating roll unit 40 into the single facer 15, the belt support member 161 supports the pressurizing belt 43 to block the lowering thereof. Therefore, the corrugating roll unit 40 is prevented from being damaged due to the contact with the pressurizing belt 43, and the corrugating roll unit 40 can smoothly move into the single facer 15. Further, at this time, the belt retaining member 171 blocks a shift of the pressurizing belt 43 in the X direction. Therefore, even if the corrugating roll unit 40 moves into the single facer together with the replacement carriage 101, the replacement carriage 101 is not shifted in the mounting direction X1 together with the corrugating roll unit 40.

When the corrugating roll unit 40 is mounted to the single facer 15, the connection device 103 is operated to release the connection between the replacement carriage 101 and the corrugating roll unit 40 by the locking hook 141. Then, when the operation of replacing the corrugating roll unit 40 is completed, the operator moves the corrugating roll unit transporting carriage 110 in the X direction and retreats it from the single facer 15.

In this manner, the corrugating roll unit replacing apparatus of the present embodiment is the corrugating roll unit replacing apparatus 100 for performing an operation of replacing the corrugating roll unit 40 between the single facer 15 and the corrugating roll unit transporting carriage 110, the apparatus including: the replacement carriage 101 capable of moving along the X direction, which is the replacement direction of the corrugating roll unit 40; the movement unit 102 capable of moving the replacement carriage 101 in the X direction; and the connection device 103 that connects the replacement carriage 101 and the corrugating roll unit 40.

Therefore, the replacement carriage 101 and the corrugating roll unit 40 are connected by the connection device 103, and the replacement carriage 101 can be moved along the X direction by the movement unit 102, so that the corrugating roll unit 40 can be removed from the single facer 15 or the corrugating roll unit 40 of the corrugating roll unit transporting carriage 110 can be mounted to the single facer 15. Therefore, it is not necessary to provide a movement unit at the corrugating roll unit transporting carriage 110, and thus the simplification of a structure and a cost reduction can be attained.

In the corrugating roll unit replacing apparatus of the present embodiment, the connection device 103 is provided at the replacement carriage 101, and includes the locking hook 141 capable of moving to the locking position where the locking hook 141 is locked to the corrugating roll unit 40 and the release position where the locking hook 141 releases the locking, and a drive device 142 capable of moving the locking hook 141. Therefore, the corrugating roll unit 40 can be easily moved along the replacement direction by moving the replacement carriage 101 in a state where the replacement carriage 101 and the corrugating roll unit 40 are connected by the connection device 103.

In the corrugating roll unit replacing apparatus of the present embodiment, when the locking hook 141 is at the locking position, the replacement carriage 101 can pull and move the corrugating roll unit 40 to one side in the X direction through the locking hook 141, and push and move the corrugating roll unit 40 to the other side in the X direction. Therefore, by moving the replacement carriage 101, it is possible to easily move the corrugating roll unit 40 along the X direction.

In the corrugating roll unit replacing apparatus of the present embodiment, the locking hook 141 can be locked to the locking pin 152 provided at the end portion on the replacement carriage 101 side of the corrugating roll unit 40. Therefore, merely by providing the corrugating roll unit 40 with the locking pin 152, the locking hook 141 that is located on the replacement carriage 101 side is locked to the locking pin 152 to be capable of connecting the replacement carriage 101 and the corrugating roll unit 40, and thus it is possible to suppress the complication of a structure.

In the corrugating roll unit replacing apparatus of the present embodiment, the guide rail 130 is provided along the X direction, the replacement carriage 101 is supported to be movable along the guide rail 130, the retreat space M1 for the replacement carriage 101 is provided on one side in the X direction of the single facer 15, and the connection space M2 for the replacement carriage 101 is provided on the other side in the X direction of the single facer 15. Therefore, during the operation of the single facer 15, by moving the replacement carriage 101 to the retreat space M1, the replacement carriage 101 does not interfere with the operation, and at the time of the operation of replacing the corrugating roll unit 40, by moving the replacement carriage 101 to the connection space M2, it is possible to easily perform the connection operation with the corrugating roll unit 40.

In the corrugating roll unit replacing apparatus of the present embodiment, the replacement carriage 101 is provided with the belt support member 161 that blocks the lowering of the pressurizing belt 43 at the time of the replacement of the corrugating roll unit 40. Therefore, when the corrugating roll unit 40 is removed from the single facer 15 and when the corrugating roll unit 40 is mounted to the single facer 15, the contact between the corrugating roll unit 40 and the pressurizing belt 43 is prevented, and thus damage to the pressurizing belt 43 can be prevented.

In the corrugating roll unit replacing apparatus of the present embodiment, the belt support member 161 is disposed along the X direction, and the inclined guide surfaces 162 and 163 inclined toward the lower side in the Z direction are provided on the upper surface of the end portion on one side in the X direction of the belt support member 161 and the upper surface of the end portion on the other side in the X direction of the belt support member 161. Therefore, when the belt support member 161 moves in the X direction to support the pressurizing belt 43, the end portion of the belt support member 161 and the end surface of the pressurizing belt 43 do not come into contact with each other, and the belt support member 161 can appropriately support the pressurizing belt 43.

In the corrugating roll unit replacing apparatus of the present embodiment, the belt support member 161 is disposed along the X direction, and the guide rollers 164 and 165 are provided at the upper end portion on one side in the X direction of the belt support member 161 and the upper end portion on the other side in the X direction of the belt support member 161. Therefore, when the belt support member 161 supports and moves the pressurizing belt 43, the frictional resistance between the belt support member 161 and the pressurizing belt 43 is reduced by the guide rollers 164 and 165, and thus damage to the pressurizing belt 43 can be prevented.

In the corrugating roll unit replacing apparatus of the present embodiment, the belt retaining member 171 that blocks a shift of the pressurizing belt 43 in the X direction at the time of the replacement of the corrugating roll unit 40 is provided. Therefore, when the corrugating roll unit is removed from the single facer 15 and when the corrugating roll unit 40 is mounted to the single facer 15, the shift of the pressurizing belt 43 can be blocked and damage to the pressurizing belt can be prevented. Further, it is possible to eliminate the need for a position adjustment operation when the pressurizing belt 43 is shifted.

Further, the corrugating roll unit replacing method of the present embodiment includes a step of connecting the replacement carriage 101 that is at the retreat position to the corrugating roll unit 40 mounted to the single facer 15, a step of removing the corrugating roll unit 40 from the single facer 15 by moving the replacement carriage 101 along the removal direction X2 of the corrugating roll unit 40, a step of releasing the connection between the replacement carriage 101 and the removed corrugating roll unit 40 and connecting the replacement carriage 101 and the corrugating roll unit 40 mounted on the corrugating roll unit transporting carriage 110, a step of mounting the corrugating roll unit 40 mounted on the corrugating roll unit transporting carriage 110 to the single facer 15 by moving the replacement carriage 101 along the mounting direction X1 of the corrugating roll unit 40, and a step of releasing the connection between the replacement carriage 101 and the mounted corrugating roll unit 40 and moving the replacement carriage 101 to the retreat position. Therefore, it is not necessary to provide a movement unit at the corrugating roll unit transporting carriage 110, and thus the simplification of a structure and a cost reduction can be attained.

In the embodiment described above, the movement unit 102 is composed of the drive motor 135, the drive sprocket 136, the driven sprocket 137, and the chain 138. However, there is no limitation to this configuration. For example, a configuration may be made such that a rack is provided on the lower surface of the replacement carriage 101 and a drive pinion of a drive motor provided on the floor surface G meshes with the rack.

REFERENCE SIGNS LIST

10: corrugating machine (cardboard sheet manufacturing apparatus)
11: mill roll stand
12: preheater
13: mill roll stand
14: preheater
15: single facer
16: bridge
17: mill roll stand
18: preheater
19: glue machine
20: double facer
21: rotary shear
22: slitter scorer
23: cutoff
24: defective sheet rejecting device
25: stacker
40: corrugating roll unit
41: belt roll
42: tension roll
43: pressurizing belt
44: upper corrugating roll
45: lower corrugating roll
51: adhesive equipment
100: corrugating roll unit replacing apparatus
101: replacement carriage
102: movement unit
103: connection device
110: corrugating roll unit transporting carriage
111: mounting base
112: first wheel
113: second wheel
114, 115: guide rail
121, 122: frame
123: connecting beam
131: carriage main body
132: frame
133: upper beam
134: wheel
135: drive motor
136: drive sprocket
137: driven sprocket
138: chain
141: locking hook
141*a*: locking recessed portion
142: drive device
147: fluid pressure cylinder
152: locking pin
161: belt support member
162, 163: inclined guide surface
164, 165: guide roller
171: belt retaining member
172: fluid pressure cylinder
174: support member
A: bottom liner
B: medium
C: top liner
D: single-faced cardboard sheet
E, F: double-faced cardboard sheet
G: floor surface
M1: retreat space
M2: connection space
N1: first accommodation portion
N2: second accommodation portion
X1: mounting direction
X2: removal direction

The invention claimed is:

1. A cardboard sheet manufacturing apparatus, comprising:

a single facer on which a first corrugating roll unit is mounted;

a corrugating roll unit transporting carriage on which a second corrugating roll unit is mounted; and a corrugating roll unit replacing apparatus moveable in a replacement direction between the single facer and the corrugating roll unit transporting carriage for replacing the first corrugating roll unit with the second corrugating roll unit, the corrugating roll unit replacing apparatus comprising:

a replacement carriage moveable along the replacement direction;

a carriage driver configured to move the replacement carriage in the replacement direction; and a connector configured to connect the replacement carriage and the first and second corrugating roll units together, wherein the corrugating roll unit transporting carriage is configured to shift to a position in the replacement direction towards the single facer, the single facer, on which the first corrugating roll unit is mounted, is on one side of the corrugating roll unit transporting carriage, on which the second corrugating roll unit is mounted, in the replacement direction, the corrugating roll unit transporting carriage, on which the second corrugating roll unit is mounted, is on an other side of the single facer, on which the first corrugating roll unit is mounted, in a direction opposite to the replacement direction, the corrugating roll unit transporting carriage comprising a mounting base and a first guide rail disposed on the mounting base, the first guide rail extending in the replacement direction, the corrugating roll unit replacing apparatus comprising a second guide rail connected in series to the first guide rail of the corrugating roll unit transporting carriage, a retreat space is on the one side of the corrugating roll unit transporting carriage in the replacement direction, the replacement carriage being disposed in the retreat space during operation of the single facer, a connection space is on the other side of the single facer in the direction opposite to the replacement direction, the replacement carriage being disposed in the connection space for replacement of the first corrugating roll unit with the second corrugating roll unit, the replacement carriage is located on the one side of the corrugating roll unit transporting carriage in the replacement direction, and the replacement carriage is supported to be movable along the first guide rail between the retreat space and the connection space.

2. The cardboard sheet manufacturing apparatus according to claim 1, wherein the connector is provided at the replacement carriage, and the connector includes:

a locking hook moveable to a locking position where the locking hook is locked to the first and second corrugating roll units and a release position where the locking hook releases the locking, and a hook driver configured to move the locking hook.

3. The cardboard sheet manufacturing apparatus according to claim 2, wherein in response to the locking hook at the locking position, the replacement carriage is configured to pull and move the second corrugating roll unit to the one side in the replacement direction through the locking hook, and push and move the first corrugating roll unit to the other side in the replacement direction through the locking hook.

4. The cardboard sheet manufacturing apparatus according to claim 2, wherein the locking hook is configured to be locked to a locking pin provided at an end portion on the one side of the first and second corrugating roll units.

5. The cardboard sheet manufacturing apparatus according to claim 1, wherein the single facer includes:

upper and lower corrugating rolls configured to clamp medium paper and perform corrugating processing, and an endless pressurizing belt configured to be wound around a plurality of support rolls and pressurize and join the corrugated medium paper and a liner together with one of the upper and lower corrugating rolls, and the replacement carriage is provided with a belt supporter configured to block lowering of the pressurizing belt during an operation of replacing the upper and lower corrugating rolls.

6. The cardboard sheet manufacturing apparatus according to claim 5, wherein the belt supporter is disposed along the replacement direction, and inclined guide surfaces inclined toward a lower side in a vertical direction are provided on an upper surface of an end portion on one side in the replacement direction of the belt supporter and an upper surface of an end portion on an other side opposing to the one side in the replacement direction of the belt supporter.

7. The cardboard sheet manufacturing apparatus according to claim 5, wherein the belt supporter is disposed along the replacement direction, and guide rollers are provided at an upper end portion on one side in the replacement direction of the belt supporter and an upper end portion on an other side opposing to the one side in the replacement direction of the belt supporter.

8. The cardboard sheet manufacturing apparatus according to claim 5, further comprising a belt retainer configured to block a shift of the pressurizing belt in the replacement direction, wherein the belt retainer is configured to lower during the operation of replacing the upper and lower corrugating rolls and clamp the pressurizing belt together with a pressurizing belt supporter fixed in the single facer.

9. A method in a cardboard sheet manufacturing apparatus, the cardboard sheet manufacturing apparatus comprising:

a single facer on which a first corrugating roll unit is mounted, a corrugating roll unit transporting carriage on which a second corrugating roll unit is mounted, and a corrugating roll unit replacing apparatus moveable in a replacement direction between the single facer and the corrugating roll unit transporting carriage and replacing the first corrugating roll unit with the second corrugating roll unit, the method comprising:

connecting, by a connector, a replacement carriage at a retreat position in a retreat space to the first corrugating roll unit, wherein the corrugating roll unit transporting carriage is configured to shift to a position in the replacement direction towards the single facer, the single facer, on which the first corrugating roll unit is mounted, is on one side of the corrugating roll unit transporting carriage, on which the second corrugating roll unit is mounted, the replacement direction, the corrugating roll unit transporting carriage, on which the second corrugating roll unit is mounted, is on an other side of the single facer, on which the first corrugating roll unit is mounted, in a direction opposite to the replacement direction, the corrugating roll unit transporting carriage comprising a mounting base and a first guide rail disposed on the mounting base, the first guide rail extending in the replacement direction the corrugating roll unit replacing apparatus comprising a second guide rail connected in series to the first guide rail of the corrugating roll unit transporting carriage, the retreat space is on the one side of the corrugating roll unit transporting carriage in the replacement direction, the replacement carriage being disposed in the retreat space during operation of the single facer, a connection space is on the other side of the single facer in the direction opposite to the replacement direction, the replacement carriage being disposed in the connection space for replacement of the first corrugating roll unit with the second corrugating roll unit, the replacement carriage is located on the one side of the corrugating roll unit transporting carriage in the replacement direction, and the replacement carriage is supported to be moveable along the first guide rail in the replacement direction between the retreat space and the connection space;

removing the corrugating roll unit from the single facer by moving, by a carriage driver configured to move the replacement carriage in the replacement direction, the replacement carriage along a direction of removing the first corrugating roll unit to the connection space;

releasing a connection between the replacement carriage and the removed first corrugating roll unit;

connecting the replacement carriage and a further corrugating roll unit mounted on the corrugating roll unit transporting carriage;

mounting the further corrugating roll unit to the single facer by moving the replacement carriage along a direction of mounting the further corrugating roll unit toward the single facer; and releasing a connection between the replacement carriage and the mounted second corrugating roll unit and moving the replacement carriage to the retreat position, wherein the replacement carriage is located on the one side of the replacement direction with respect to the carriage driver.

* * * * *